INVENTORS
MASAKATSU SAKAMOTO — KENJI UCHIDA
YASUNORI YAMADA & TAKASHI YAMAGUCHI

BY Craig & Antonelli

ATTORNEYS

United States Patent Office 3,556,682
Patented Jan. 19, 1971

3,556,682
APPARATUS FOR LIQUID DISPLACEMENT TRANSFER
Masakatsu Sakamoto and Kenji Uchida, Tokyo, and Yasunori Yamada and Takashi Yamaguchi, Yokohama, Japan, assignors to Hitachi, Ltd., Tokyo, Japan, a corporation of Japan
Filed Aug. 12, 1968, Ser. No. 752,002
Claims priority, application Japan, Aug. 14, 1967, 42/69,631; Sept. 4, 1967, 42/75,267; Sept. 29, 1967, 42/62,335; Nov. 27, 1967, 42/99,157; Dec. 28, 1967, 43/83,608, 43/83,609; Jan. 5, 1968, 43/347
Int. Cl. F04f *11/00;* F04b *19/22;* G01f *23/06*
U.S. Cl. 417—102                                    7 Claims

ABSTRACT OF THE DISCLOSURE

In an apparatus for pumping a first liquid or liquid substance, e.g. slurry according to the principle of alternate displacement of the first liquid and a second or driving liquid in a vessel, the improvements according to the present invention reside in that a float member having a specific weight lying between those of the first and the second liquid and a peripheral ring portion of magnetic material is provided in the vessel, which in turn is provided with wall portions of nonmagnetic material and magnetic proximity detectors for detecting the float member at its upper and lower limit positions, whereby automatic control of operation of the apparatus is improved to positively produce substantially constant flows of the first and the second liquid and the danger of water hammer is avoided.

BACKGROUND OF THE INVENTION

(1) Field of the invention

The present invention relates to an apparatus for liquid displacement transfer comprising a substantially cylindrical vessel equipped with inlet and outlet pipes for a first liquid to be transferred at the bottom portion thereof and inlet and outlet pipes for a second or driving liquid at the top portion thereof, said second liquid having a smaller specific weight than said first liquid, said inlet and outlet pipes for first and second liquids each being equipped with a valve means, and a float member movable in said vessel along its axis and having a bulk specific weight lying between those of the first and the second liquid, whereby the first liquid to be transferred which has been charged into said vessel through the inlet pipe for first liquid at a relatively low pressure by discharging the second liquid through the outlet pipe for second liquid is discharged through the outlet pipe for first liquid at a relatively high pressure by being driven by the second or driving liquid charged into said vessel through the inlet pipe for second liquid.

(2) Description of the prior art

Apparatuses for pumping liquid or liquid substance such as slurry of coal or minerals according to the principle of alternate displacement of the liquid to be pumped and another driving liquid in a vessel in a manner as described in the above are known. However, known apparatuses of the kind are mostly considered in the level of ideal operational conditions and have not yet solved various problems which will be encountered in the real operation of such apparatuses.

One of those problems is how to determine the time point for switching over the displacement between the liquid substance and the driving liquid. In a known apparatus, the time point for the switching-over is determined according to a predetermined time cycle. In this system, however, there is a danger that a slight deviation from the time cycle can be accumulated to such an extent that the boundary level of the first and the second liquid comes out of the vessel. In another known apparatus, a float member is formed as a valve body which closes an outlet port for the liquid substance formed as a valve seat at one end of the vessel and an outlet port for the driving liquid formed as another valve seat at the other end of the vessel, whereby the extreme end positions of the float member or the time point for the switching-over may be detected by the stoppage of the flow or an increase of the hydraulic pressure in a charging line. However, it is not assured in this system that the valves always operate satisfactorily, especially when the liquid substance is a mixture including solid substance such as slurry, because the solid substance may interfere into the valve body and seat and obstruct the closing of the valve. Still another known apparatus is provided with a mechanical means for detecting extreme end positions of a float member, wherein a rod extending along an axis of a vessel and through the float member is actuated by the float member at its extreme end positions in a manner that the float member abuts against stopper means provided on the rod and draws the rod together with it. Such a mechanical means does not always operate satisfactorily either, because the solid substance may again interfere into sliding elements, causing sticking of the elements and serious wear of them.

Another problem resides in the structure of a float member. In known apparatuses, the float member is formed as a disk having a cylindrical side wall or a mere sphere. However, such a disk is apt to bite into the wall of a vessel and stick thereto when it was inclined with reference to the vessel. Especially, when a liquid including solid substance such as slurry is dealt with, a wedge space defined by the side wall of the inclined disk and the wall of the vessel is filled with the solid substance, which acts as a solid wedge and prevents the restoration of the normal position of the disk. A mere sphere causes no change of outermost diameter and therefore no biting due to its inclination. However, it is noted that a mere sphere is constantly exposed to the danger of the above-mentioned wedging and sticking. In addition, a mere sphere can rotate freely, whereby there is a drawback that solid substance is rolled into the space between the sphere and the wall of the vessel due to the rotation thereof and accelerates the sticking of the float member.

Still another problem resides in the control of the alternate displacement in the vessels when a plurality of vessels are arranged in parallel so that the vessels are successively operated in such a manner as to produce constant overall inlet and outlet flows of the liquid substance or slurry and the driving liquid. In known apparatuses, it is certainly intended that the alternate displacement or charging and discharging of the liquid substance and the driving liquid into and from the vessels are successively and continuously performed in respective vessels so that constant overall inlet and outlet flows of the liquid substance and the driving liquid are obtained and thereby occurrence of the water hammer is avoided. For such operation, it is necessary that the flow rate of the driving liquid when it is charged into the vessels or the flow rate of the liquid substance when it is discharged from the vessels must be strictly equal to the flow rate of the driving liquid when it is discharged from the vessels or the flow rate of the liquid substance when it is charged into the vessels, because otherwise any slight difference between the above-mentioned two flow rates will be accumulated in a long period of operation to such an extent that there occurs a situation that, for example, the inlet valve for the liquid substance and the outlet valve for the driving liquid are opened while the inlet valve for the driving liquid and the outlet valve for the liquid substance are still open, whereby the liquid substance is driven backward and the driving liquid is wastefully shortcircuited from the inlet pipe to the outlet pipe. However, it is practically impossible to keep the above-mentioned two flow rates strictly equal with each other over a long period of operation.

There are some other minor problems which, however, must be solved without fail in known apparatuses of the kind, if such apparatuses should practically operate in satisfactory condition.

SUMMARY OF THE INVENTION

The present invention is therefore intended to solve these problems in the known apparatuses and to provide an improved apparatus for liquid displacement transfer.

The apparatus for liquid displacement transfer as described at the beginning is, according to the generic feature of the present invention, characterized in that said vessel has wall portions of nonmagnetic material along its axis at predetermined levels thereof, that said float member has a peripheral portion of magnetic material adapted to be positioned adjacent the wall of said vessel, and that magnetic proximity detectors are provided at the outside of said nonmagnetic wall portions to detect predetermined upper and lower limit positions of said float member and thereby to control said valve means.

According to an aspect of the present invention, the apparatus is characterized in that said float member has a body having high stability of floating and a peripheral ring portion of an outer diameter slightly smaller than the inner diameter of the vertically positioned cylindrical wall of said vessel, ring portion being so adapted as to be normally positioned in a horizontal plane when said float member is in its floating condition.

According to another aspect of the present invention, the apparatus is characterized in that at least three vessels with said inlet and outlet pipes and valve means are arranged in parallel so that said vessels are successively operated in such a manner as to produce substantially constant overall inlet and outlet flows of the first and the second liquid, and that there are provided automatic control means for controlling flow rates $Q_1$ and $Q_2$ of the second liquid when it is charged into and discharged from said vessels, respectively, in such a manner that either $Q_2 = KaQ_1$ ($Ka$ is slightly larger than unit) or $Q_2 = KbQ_1$ ($Kb$ is slightly smaller than unit) is satisfied and that when it is operated at the condition of $Q_2 = KaQ_1$, the switching-over from the condition $Q_2 = KaQ_1$ to the condition $Q_2 = KbQ_1$ is effected when a time interval $t$ from closing of the inlet valve to opening of the outlet valve for second liquid in a vessel has shortened beyond a predetermined time T, and when it is operated at the condition of $Q_2 = KbQ_1$, the switching-over from the condition $Q_2 = KbQ_1$ to the condition $Q_2 = KaQ_1$ is effected when a time interval $t'$ from closing of the outlet valve to opening of the inlet valve for second liquid in a vessel has shortened beyond a predetermined time T'.

Other aspects and advantages of the above and the other aspects of the present invention will become apparent from the following descriptions of the preferred embodiments of the present invention made with reference to the accompanying drawings.

BRIEF DESCRIPTION OF THE DRAWINGS

Some preferred embodiments are shown in the accompanying drawings, in which.

DESCRIPTION OF THE PREFERRED EMBODIMENTS

The present invention will now be explained in the form of some preferred embodiments with reference to the accompanying drawings. In the following description, the first liquid, which is liquid or liquid substance including solid substance such as slurry of coal or minerals and the second or driving liquid having a smaller specific weight than the first liquid are merely called as slurry and driving liquid, respectively, for the purpose of simplicity of description, but with no intention of limiting the present invention only to a slurry transfer apparatus.

Figure 1:
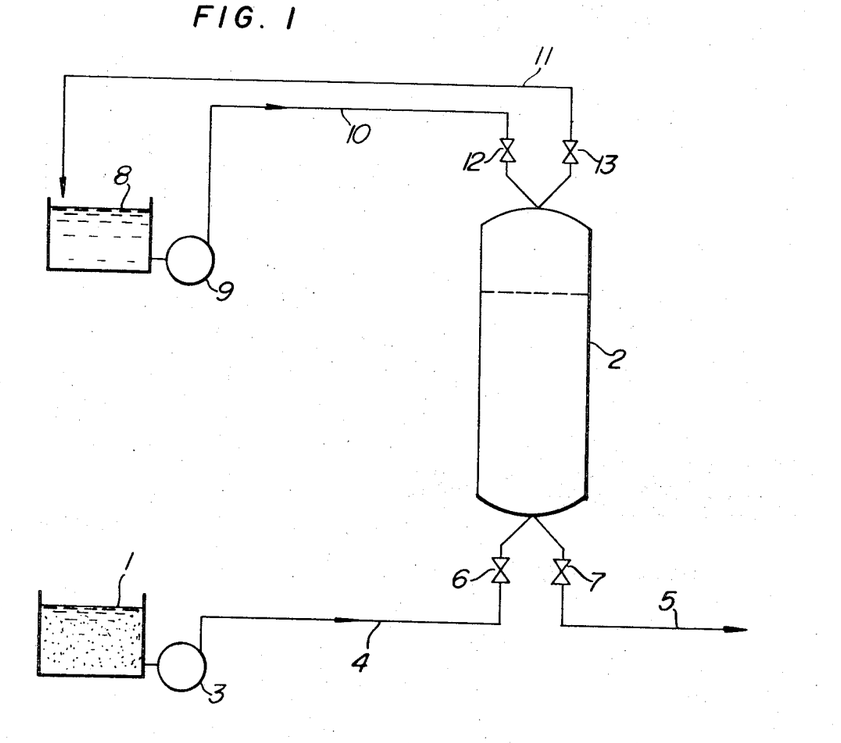
FIG. 1 is a diagrammatic illustration of an apparatus for liquid displacement transfer according to the principle of alternate displacement of liquid in a vessel.

Referring to FIG. 1, there is shown an apparatus for liquid displacement transfer which is to be operated according to the principle of alternate displacement of liquid in a vessel. This apparatus includes a substantially cylindrical vessel 2 positioned vertically and adapted to act as a pumping chamber, which is connected with a slurry inlet pipe 4 and a slurry outlet pipe 5 at its botttom portion, and a driving liquid inlet pipe 10 and a driving liquid outlet pipe 11 at its top portion. These inlet and outlet pipes are provided with valves 6, 7 and 12, 13, respectively. Slurry is stored in a slurry tank 1 and can be transferred by a slurry pump 3 via the slurry inlet pipe 4 into the vessel. On the other hand, driving liquid is stored in a driving liquid tank 8 and can be transferred by a driving liquid pump 9 via the driving liquid inlet pipe 10 into the vessel. The driving liquid is selected to be a liquid which has a specific weight smaller than that of the slurry.

In operation, first, the valves 6 and 13 are opened and the valves 7 and 12 are closed. Then the pump 3 is operated and thereby the vessel is charged with slurry. When the vessel has been charged with slurry, the valves 6 and 13 are closed and the valves 7 and 12 are opened. Then the pump 9 is operated and the vessel is charged with driving liquid, whereby the slurry accumulated in the vessel is discharged through the opened valve 7 and the slurry outlet pipe 5. When the slurry in the vessel has been displaced by the driving liquid, the valves 7 and 12 are closed and again the valves 6 and 13 are opened, whereby the vessel is again charged with slurry by discharging the driving liquid accumulated in the vessel through the valve 13 and the pipe 11. The discharged driving liquid is returned to the tank 8 and is used circulatingly. By repetition of the above-mentioned operation, slurry is intermittently pumped, wherein the slurry can be delivered at a substantiallly higher pressure than the delivery pressure of the pump 3 if the delivery pressure of the pump 9 is selected to be such a high value. This is very advantageous because it is difficult to obtain a slurry pump of high delivery pressure, while it is easy to obtain a pure liquid pump of high delivery pressure.

Figure 2:
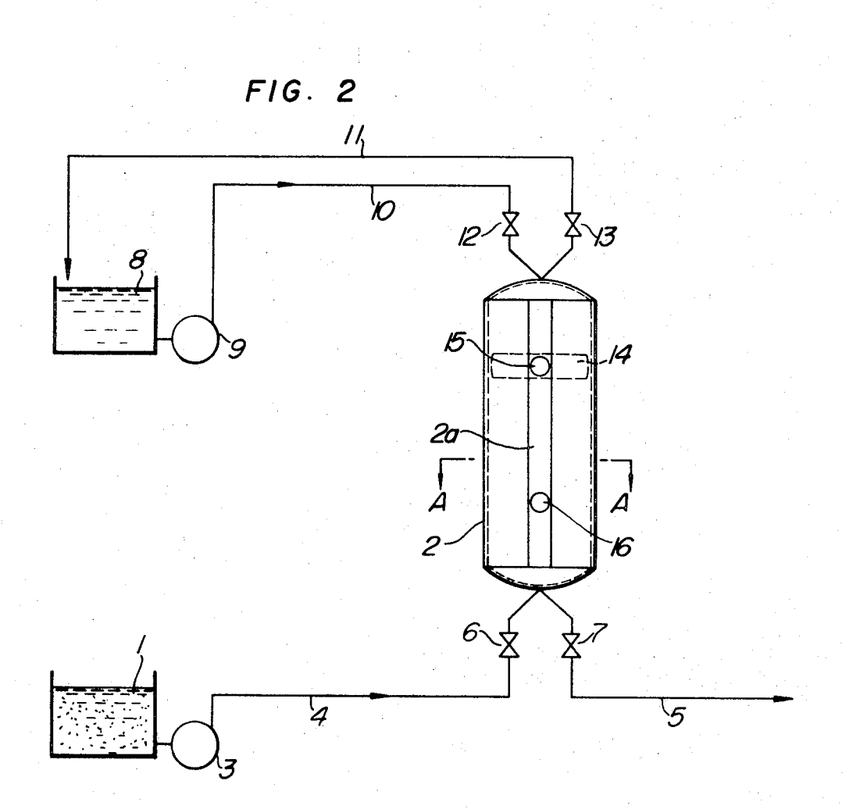
FIG. 2 is a diagrammatic illustration of an apparatus of the same kind as that shown in FIG. 1, embodying the generic feature of the present invention.
Figure 3:
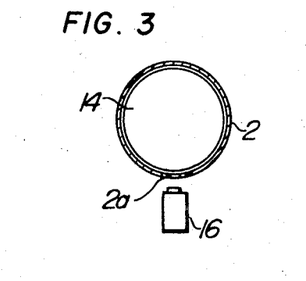
FIG. 3 is a cross section taken along line A—A in FIG. 2.

FIG. 2 shows a generally like apparatus as that shown in FIG. 1, except that it is embodying the generic feature of the present invention. Therefore, portions designated by the same reference numerals as those in FIG. 1 are to be considered to operate in the same way. The vessel 2 in the apparatus shown in FIG. 2, which is also a substantially cylindrical one, has a wall portion 2a which is extending along the axis of the vessel and is made of a nonmagnetic material such as, for example, austenitic stainless steel. Although the nonmagnetic wall portion 2a in this embodiment has a form of longitudinally extending strip, it may be separated into several spaced portions located at predetermined levels along the axis of the vessel. Within the vessel, there is provided a float member 14 which is freely movable along the axis of the by the float member is always positioned at the border of a magnetic material and is adapted to be positioned adjacent the nonmagnetic wall portion of the vessel. The specific weight of the float member is selected to lie between those of the slurry and the driving liquid, whereby the float member is always positione dat the border of the slurry portion and the driving liquid portion in the vessel. Thus, the float member has two functions of representing the boundary level of slurry and driving liquid and of separating slurry from driving liquid. Along the nonmagnetic wall portion 2a and at the outside thereof, there are provided two sets of magnetic proximity detectors 15 and 16 as shown in FIGS. 2 and 3. These proximity detectors are positioned at predetermined upper and lower levels of the slurry in the vessel and is so adapted as to magnetically detect the magnetic peripheral portion of the floating member when it has come to the predetermined positions. Signals from the proximity detectors are used to automatically control the valves 6, 7, 12, 13, which are now constituted as automatic control valve means, whereby the cyclic operation of the apparatus is automatically continued.

Figure 4:
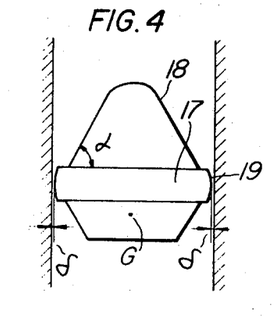
FIG. 4 is an elevational view of a first embodiment of the float member according to the present invention shown in its normally floating condition.
Figure 5:
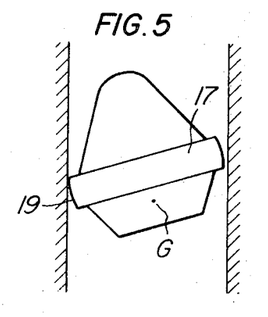
FIG. 5 shows said float member in its inclined floating condition.

Although the float member 14 is shown as a mere disk member in FIGS. 2 and 3 for the purpose of simplicity, there are several requirements regarding the practical structure of the float member as already discussed before. FIG. 4 shows a first preferred embodiment of the float member. This float member has a rim or ring portion 17 presenting the magnetic peripheral portion made of, for example, carbon steel and a convex top portion 18. A bottom portion under the rim portion may have any proper shape so that the center of gravity G is located at such a low position that the float member has high stability of floating. The bottom portion may be provided with a weight which at the same time adjusts the specific weight of the float. In this embodiment, the rim 17 has an annular side wall 19 which has a spherical face having a diameter smaller than the inner wall diameter of the vessel by $2\delta$, wherein $\delta$ is a clearance which is large enough to avoid the biting of any solid substance included in the slurry but is small enough to assure the operation of the magnetic proximity detectors and the separation of slurry and driving liquid. The convex top portion has a base angle $\alpha$ which is larger than the angle of repose, whereby it is avoided that the solid substance which has passed through the clearance $\delta$ by chances is accumulated on the float member and increases the apparent specific weight of the float member. Due to the spherical side wall 19, there occurs no change of the clearance by any inclination of the float member as shown in FIG. 5, whereby the danger that the solid substance in the slurry is bitten by the rim 17 and the inner wall of the vessel and thereby the float member sticks in the vessel is avoided. Since the peripheral ring portion 17 has a limited thickness, a relatively large inclination of the float member, which will sometimes occur in operation, releases the solid substance accumulated in the wedge space defined by the spherical side wall 19 and the inner wall of the vessel.

Figure 6:
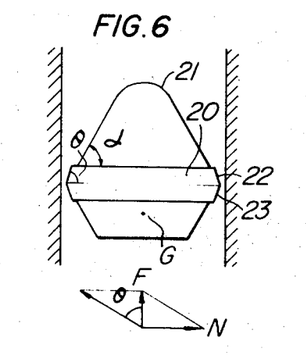
FIG. 6 is an elevational view of a second embodiment of the float member according to the present invention.

FIG. 6 shows another embodiment of the float member, wherein a rim or ring portion 20 is composed of two frusta of a cone 22 and 23, which are piled in opposite relation, bottoms in contact. The base angle $\theta$ of these frusta may be determined by the following formulae:

Assuming that the solid substance included in the slurry has been packed in the space defined by the inner wall of the vessel and the side wall of the frustum 22 and that the packed solid substance behaves as if it were a unitary solid substance or a wedge, force F which pushes the float member upward will produce a component of force N acting at right angle to the inner wall of the vessel defined by:

$$N = F \tan \theta \quad (1)$$

Therefore, if the float member can be moved upward by the force F, a condition $$F > \mu N \quad (2)$$

must be satisfied, wherein $\mu$ is the friction coefficient between the solid substance and the inner wall of the vessel. By entering N of the Equation 1 into the inequality 2.

$$F > \mu F \tan \theta$$
$$\therefore \tan \theta < 1/\mu$$
$$\therefore \theta < \tan^{-1} 1/\mu$$

is obtained. If it is assumed $\mu = 0.3$, $$\theta < 73°18'$$

is obtained. In other words, if the base angle $\theta$ of the frustum 22 is smaller than 73°18', there occurs no sticking of the float member due to the wedging of solid substance. In this embodiment, it is preferable that the base angle $\alpha$ of a convex top portion 21 is also larger than the angle of repose of the solid substance in the slurry.

Figure 7:
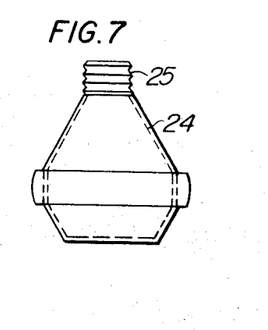
FIG. 7 is an elevational view of a third embodiment of the float member according to the present invention.
Figure 8:
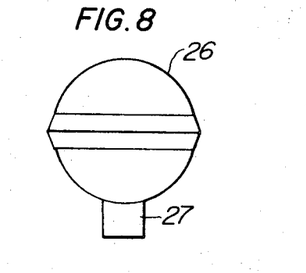
FIG. 8 is an elevational view of a fourth embodiment of the float member according to the present invention.

An apparatus for liquid displacement transfer of this kind is often designed for a high pressure. In such a case, the float member must be so constituted that it can stand the high pressure. FIGS. 7 and 8 show two embodiments of the float member especially considered for high pressure operation. The float member shown in FIG. 7 has a shell body including a frustum top portion 24 and a bellows member 25. This body is hermetically filled with liquid of a required specific weight. If this float member is subjected to high outside pressure, the bellows member contracts very slightly to such an extent that the pressure rise in the shell due to the hydraulic modulus of elasticity balances the outside pressure. Since the hydraulic modulus of elasticity is generally very large, the change of volume of the shell and accordingly the change of the specific weight of the float member is negligible. In the embodiment shown in FIG. 8, the body is formed as a sphere 26 so that it can stand high outside pressure. In this sphere body, a weight 27 is necessary to stabilize the float member so that the magnetic peripheral ring portion is always positioned horizontally.

The apparatus shown in FIG. 2 can continue its operation automatically, but transfer of slurry by this apparatus can be performed only intermittently. If the slurry is to be pumped continuously as a constant flow, it is necessary that at least three vessels are arranged in parallel and are operated successively in a manner that at the end of pumping slurry in a vessel, a next vessel begins pumping slurry.

Figure 9:
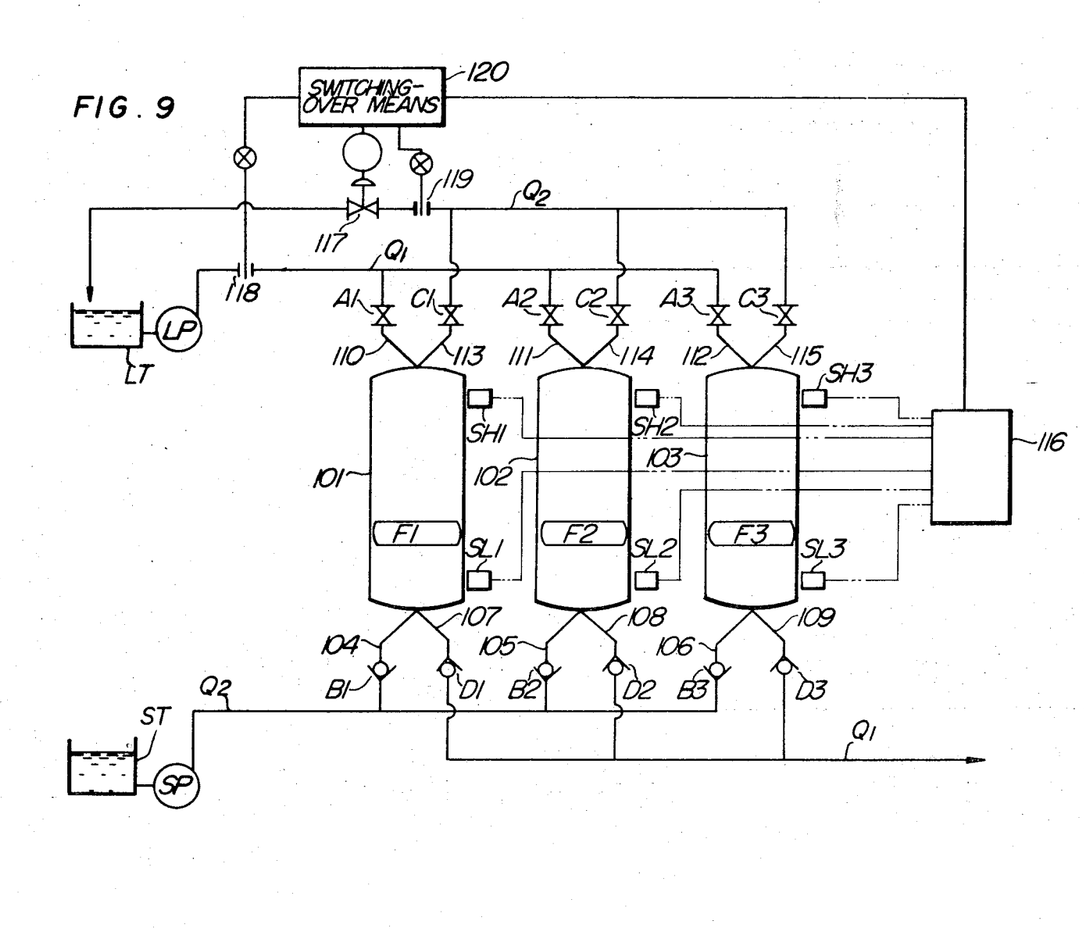
FIG. 9 is a diagrammatic illustration of an apparatus for liquid displacement transfer including three vessels arranged in parallel and being equipped with automatic flow control means according to the present invention.

FIG. 9 shows an apparatus including three vessels arranged in parallel. From FIG. 9, it will be noted that this apparatus includes three parallel systems, each including a vessel, inlet and outlet pipes for slurry each including a valve means, and inlet and outlet pipes for driving liquid, each also including a valve means. The three inlet pipes for slurry 104, 105 and 106 are commonly supplied with slurry by a slurry pump SP, which in turn is supplied with slurry from a slurry tank ST. The three outlet pipes for slurry 107, 108 and 109 are connected together to be lead to an application spot. On the other hand, the three inlet pipes for driving liquid 110, 111 and 112 are commonly supplied with driving liquid by a driving liquid pump LP, which in turn is supplied with driving liquid from a driving liquid tank LT. The three outlet pipes for driving liquid 113, 114 and 115 are connected together to be returned to the tank LT. It will also be noted that, in this embodiment, the inlet and outlet valves for slurry B1–B3 and D1–D3 are consituted as check valves. The three vessels 101, 102 and 103 are provided with float member F1, F2 and F3 of an above-mentioned kind and magnetic proximity detectors SH1–SH3 and SL1–SL3 for detecting upper and lower limit positions of the float members, respectively, Signals from the proximity detectors are introduced into a controller 116, and by this controller the inlet and outlet valves for driving liquid A1–A3 and C1–C3 are controlled, though the routes of such control signals are not shown for the purpose of simplicity.

Figure 10:
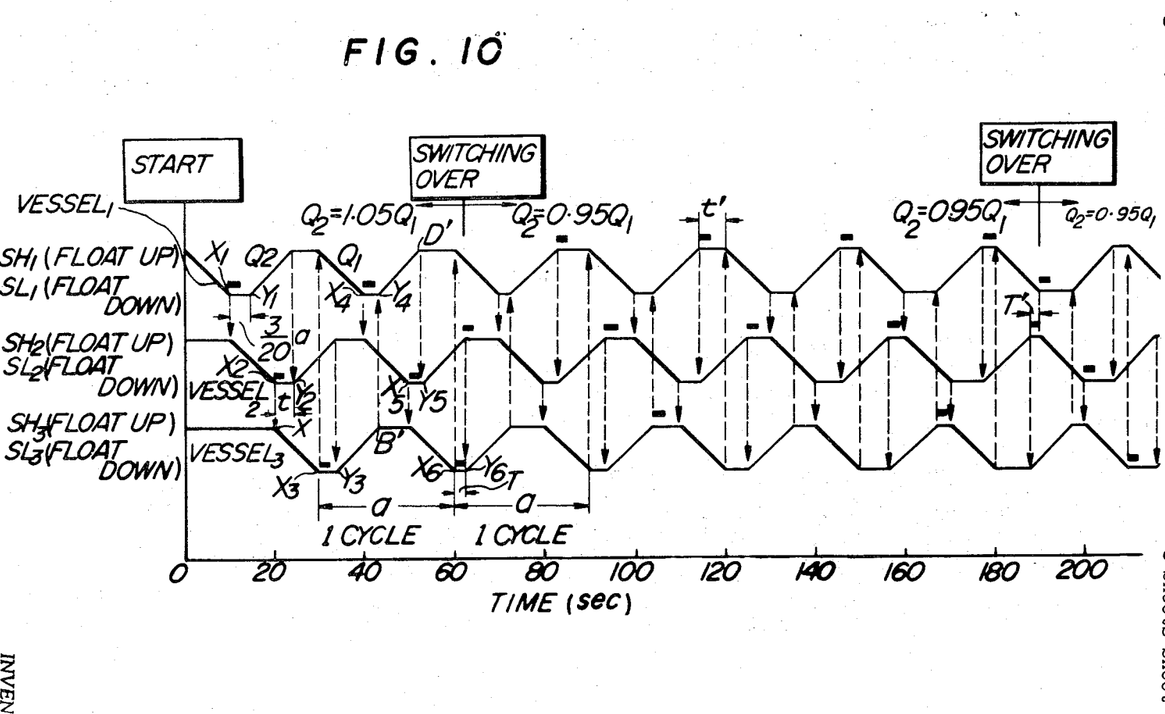
FIG. 10 is a diagram showing operation of the apparatus shown in FIG. 10.

The apparatus as described in the above operates as follows: Let us assume that all vessels are filled with slurry or the float members F1–F3 are positioned at their upper limit positions opposing to the proximity detectors SH1–SH3, that all inlet and outlet valves are closed, and that the driving liquid pump LP and the slurry pump SP are operated, as a starting condition. At first, the valve A1 is opened, whereby driving liquid is forced into the vessel 101 and accordingly the slurry in the vessel is discharged through the check valve D1, the check valve B1 being kept closed at this time. When the float member F1 has reached its lower limit position, the proximity detector SL1 detects the float member, whereby the controller 116 is actuated and closes the valve A1 and opens the valve A2 at the same time. Then a slurry outlet flow which has been maintained by the slurry discharged from the vessel 101 is successively and continuously maintained by the slurry discharged from the vessel 102. When the float member F2 has reached its lower limit position, the constant slurry outlet flow is then maintained by the slurry discharged from the vessel 103. In this way, a constant slurry flow is delivered by this apparatus by cyclic operation of the three vessels. On the other hand, after a predetermined time has passed after the closing of the valve A1, the valve C1 is opened, whereby slurry is charged into the vessel 101 by the slurry pump SP by discharging the driving liquid which has been charged into the vessel during the preceding slurry discharging operation. When the float member F1 has reached its upper limit position, it is detected by the proximity detector SH1, whereby the controller 116 is actuated and closes the valve C1 and opens the valve C2 at the same time. In the same way the valve C3 is opened at the same time as the valve C2 is closed, and thus a continuous flow of driving liquid is maintained. If these operations of respective vessels are expressed in a diagram, it will become three shifted sinuous lines as shown in FIG. 10.

Figure 11:
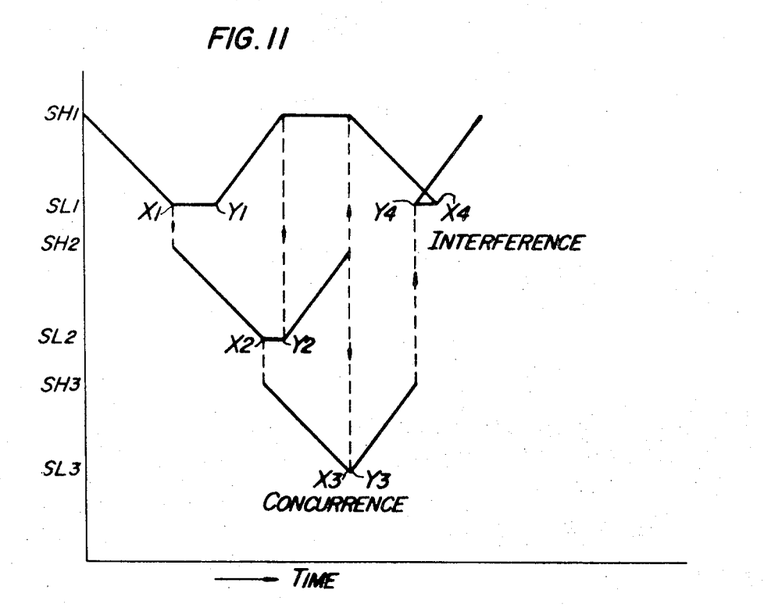
FIG. 11 is a portion of a diagram of the same kind as that shown in FIG. 10, showing a wrong condition of operation.

Now, if the cyclic operations with three vessels as described in the above is to be continued over a long period of operation, it is necessary that the volumetric flow rate $Q_1$ of the driving liquid delivered by the pump LP is strictly equal to the volumetric flow rate $Q_2$ of the slurry delivered by the pump SP. Because, if, for example, the flow rate $Q_1$ is slightly smaller than the flow rate $Q_2$ (see FIG. 11), the inclination of the line representing discharging of slurry from a vessel is smaller than that of the line representing charging of slurry into the vessel in the diagram, and therefore, the time interval X–Y from closing of the valve A(1–3) to opening of the valve C(1–3) is gradually shortened and at last an interference occurs wherein the valve C(1–3) opens before the valve A(1–3) loses, whereby short circuiting of driving liquid from the valve A to the valve C occurs. Nevertheless, it is practically impossible to maintain the flow rate $Q_1$ and $Q_2$ to be strictly equal to each other.

To solve this problem, the apparatus shown in FIG. 9 is provided with a flow control valve 117, flow metering orifices or nozzles 118 and 119 and a switching-over means 120. The flow control valve 117 is so adapted that it controls the flow rate $Q_2$ to be either $Q_2=KaQ_1$ or $Q_2=KbQ_1$, wherein $Ka$ is a valve slightly larger than unit such as, for example, 1.05 and $Kb$ is a valve slightly smaller than unit such as, for example, 0.95.

Operation of this flow control means will be explained with reference to FIG. 10. It is also assumed that three vessels are all charged with slurry, the valves A1–A3 and C1–C3 are all closed and the flow control valve 117 is set to the condition of $Q_2=1.05Q_1$. Now, the apparatus is started by opening the valve A1, whereby slurry is discharged from the vessel 101, and when the float member F1 has reached the position of SL1 or X1 in the diagram, discharging of slurry from the vessel 102 is started. When the float member F2 has reached X2, discharging of slurry from the vessel 103 is started, and in this manner, a constant flow of slurry is maintained by successive discharging of slurry from respective vessels. Charging of slurry into the vessel 101 is started at Y1 or, for example, 3/20$^a$ second after closing of the valve A1, wherein $a$ is one period of cycle of operation. When the float member F1 has reached the position of SH1, charging of slurry into the vessel 102 is started, and so on. Since the flow rates $Q_1$ and $Q_2$ are so controlled that $Q_2=1.05Q_1$ is satisfied, the time intervals X1–Y1, X2–Y2, X3–Y3 ... each being the time from closing of the valve A(1–3) to opening of the valve C(1–3), decreases gradually. When the time interval $t$ has shortened beyond a predetermined value T, the controller 116 sends a signal to the switching-over means 120 and the flow control valve 117 is switched over to the condition of $Q_2=0.95Q_1$. Now, the inclination of the lines representing discharging of slurry becomes steeper than that of the lines representing charging of slurry, and therefore, said time interval $t$ becomes gradually longer and in turn a time interval $t'$ from closing of the valve C(1–3) to opening of the valve A(1–3) gradually decreases. It will be understood that if the time interval $t'$ becomes negative, there occurs short circuiting of driving liquid from the valve A(1–3) to the valve C(1–3). Therefore, when the time interval $t'$ has shortened beyond a predetermined value T', which may be the value T, the controller 116 again sends a signal to the switching-over means 120, whereby the flow control valve 117 is again switched over to the condition of $$Q_2=1.05Q_1$$

In this manner, the apparatus can positively operate for a long period to produce substantially constant flows of slurry and driving liquid, whereby the danger of water hammer can be avoided.

Figure 12:
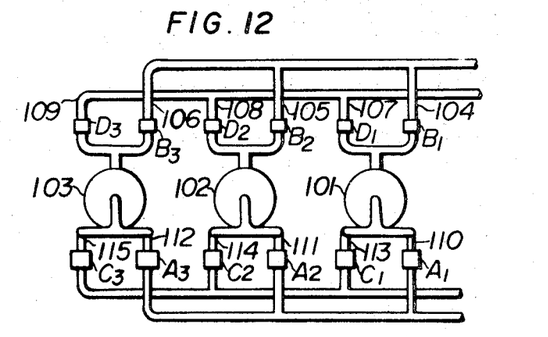
FIG. 12 is a diagrammatic plan view of an apparatus for liquid displacement transfer, showing an arrangement according to the present invention.
Figure 13:
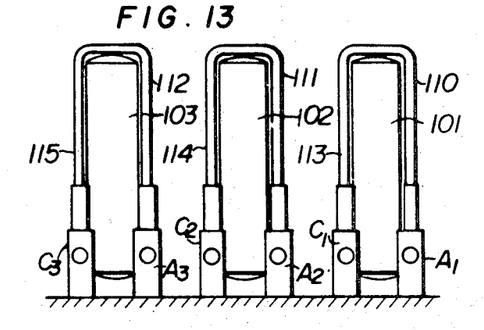
FIG. 13 is a diagrammatic front view of the apparatus shown in FIG. 12.
Figure 14:
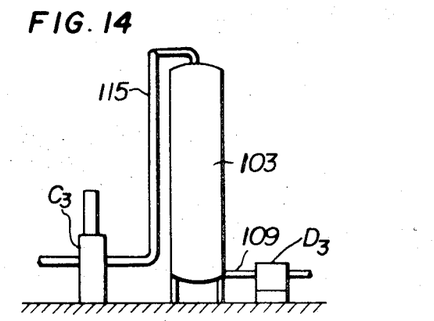
FIG. 14 is a diagrammatic end view of the apparatus shown in FIG. 12.

The apparatus including three vessels arranged in parallel as shown in FIG. 9 may preferably be arranged in practice as shown in FIGS. 12, 13, and 14, wherein same members as shown in FIG. 9 are designated by same reference numerals. In this arrangement, the three vessels are aligned or placed in line, and inlet and outlet pipes for slurry are arranged on one side of the aligned vessels, while inlet and outlet pipes for driving liquid are arranged on the other side of the vessels. The valves A1–A3, B1–B3, C1–C3 and D1–D3 may preferably be supported on the ground so that the weight of the apparatus is supported in a dispersive way and maintenance of the valves is facilitated.

Figures 15, 16:
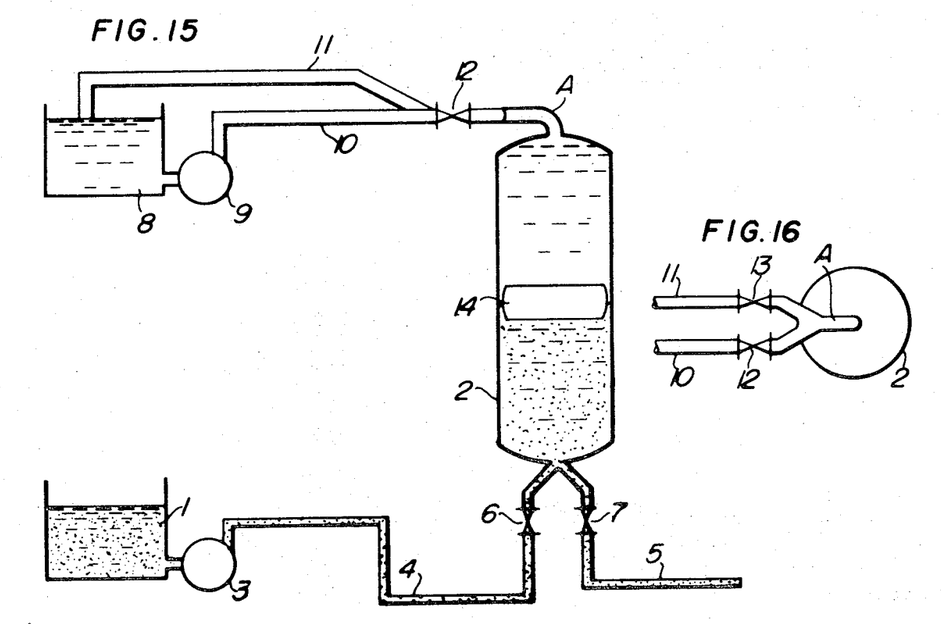
FIG. 15 is a diagrammatic illustration of an apparatus for liquid displacement transfer, showing especially a structure of inlet and outlet pipes for driving liquid.
FIG. 16 is a partial plan view of the apparatus shown in FIG. 15.

In FIGS. 15 and 16, there is shown a practical arrangement of inlet and outlet pipes 10 and 11 as shown in FIG. 2. Since the apparatus of the kind is generally operated with a slurry pump of delivery pressure of the order of kgs./cm.$^2$ and a driving liquid pump of delivery pressure of the order of ten kgs./cm.$^2$, there is a danger that water hammer occurs if the inlet valve 12 for driving liquid is opened suddenly. Therefore, when the valve 12 is to be opened, a small by-pass line (not shown) is opened in advance to raise the pressure in the vessel up to the delivery pressure of the driving liquid pump. In this occasion, if there is left in the vessel or the piping system a space which is occupied by air, a large amount of liquid is required to balance the pressure, since air has a substantially larger compressibility than liquid, and there is a danger of inducing water hammer. This danger is removed by the arrangement shown in FIGS. 15 and 16, wherein the inlet and output pipes 10 and 11 for driving liquid are connected to a convex top portion of the vessel via a common stub tube A so that there is left no space which is carelessly occupied by air in operation.

Although the present invention has been described in the above in the form of some preferred embodiments, it is not intended that the present invention is limited merely to these embodiments, but it is to be understood that a lot of modifications as well as combinations of features can be realized without departing from the spirit of the present invention.

We claim:
1. An apparatus for liquid displacement transfer comprising a substantially cylindrical vessel equipped with inlet and outlet pipes for a first liquid to be transferred at the bottom portion thereof and inlet and outlet pipes for a second or driving liquid at the top portion thereof, said second liquid having a smaller specific weight than said first liquid, said inlet and outlet pipes for first and second liquids each being equipped with valve means, and a float member movable in said vessel along its axis and having a bulk specific weight lying between those of the first and the second liquid, said vessel having wall portions of non-magnetic material along its axis at predetermined levels thereof, said float member having a peripheral portion of magnetic material adapted to be positioned adjacent the wall of said vessel, and magnetic proximity detectors are provided at the outside of said non-magnetic wall portions to detect predetermined upper and lower limit positions of said float member and thereby to control said valve means, characterized in that at least three vessels with said inlet and outlet pipes and valve means are arranged in parallel so that said vessels are successively operated in such a manner as to produce substantially constant overall inlet and outlet flows of the first and the second liquid, and that there are provide automatic control means for controlling flow rates $Q_1$ and $Q_2$ of the second liquid when it is charged into and discharged from said vessels, respectively, in such a manner that either $Q_2 = KaQ_1$ (Ka is slightly larger than unit) or $Q_2 = KbQ_1$ (Kb is slightly smaller than unit) is satisfied and that when it is operated at the condition of $Q_2 = KaQ_1$, the switching-over from the condition $Q_2 = KaQ_1$ to the condition $Q_2 = KbQ_1$ is effected when a time interval $t$ from closing of the inlet valve to opening of the outlet valve for second liquid in a vessel has shortened beyond a predetermined time T, and when it is operated at the condition of $Q_2 = KbQ_1$, the switching-over from the condition $Q_2 = KbQ_1$ to the condition $Q_2 = KaQ_1$ is effected when a time interval $t'$ from closing of the outlet valve to opening of the inlet valve for second liquid in a vessel has shortened beyond a predetermined time T'.

2. An apparatus according to claim 1, characterized in that at least three vessels with said inlet and outlet pipes and valve means are arranged in parallel in such a manner that said vessels are placed in line with said inlet and outlet pipes and valve means for first liquid being arranged at one side thereof and said inlet and outlet pipes and valve means for second liquid being arranged at the other side thereof, said valve means each being supported on the ground.

3. An apparatus according to claim 1, characterized in that said inlet and outlet pipes for second liquid are connected to a convex top portion of said vessel via a common stub tube.

4. An apparatus according to claim 1, characterized in that said valve means provided at said inlet and outlet pipes for first liquid are check valves.

5. An apparatus for liquid displacement transfer comprising a substantially cylindrical vessel equipped with inlet and outlet pipes for a first liquid to be transferred at the bottom portion thereof and inlet and outlet pipes for a second or driving liquid at the top portion thereof, said second liquid having a smaller specific weight than said first liquid, said inlet and outlet pipes for first and second liquids each being equipped with a valve means, and a float member having a body of high stability of floating and a peripheral ring portion of an outer diameter slightly smaller than the inner diameter of the vertically positioned cylindrical wall of said vessel, said ring portion being so adapted as to be normally positioned in a horizontal plane when said float member is in its floating condition, said float member movable in said vessel along its axis and having a bulk specific weight lying between those of the first and the second liquid, said vessel has wall portions of non-magnetic material along its axis at predetermined levels thereof, said float member has a peripheral portion of magnetic material adapted to be positioned adjacent the wall of said vessel, and magnetic proximity detectors are provided at the outside of said non-magnetic wall portions to detect predetermined upper and lower limit positions of said float member and thereby to control said valve means, characterized in that said peripheral ring portion has a face of double frusta of a cone piled in opposite relation, the base angle of each frustum being smaller than $\tan^{-1}/\mu$, wherein $\mu$ is the friction coefficient between solid substance included in the first liquid and the inner wall of the vessel.

6. An apparatus according to claim 5, characterized in that said body is a spherical shell provided with a weight at the bottom portion thereof.

7. An apparatus for liquid displacement transfer comprising a substantially cylindrical vessel equipped with inlet and outlet pipes for a first liquid to be transferred at the bottom portion thereof and inlet and outlet pipes for a second or driving liquid at the top portion thereof, said second liquid having a smaller specific weight than said first liquid, said inlet and outlet pipes for first and second liquids each being equipped with a valve means, and a float member having a body of high stability of floating and a peripheral ring portion of an outer diameter slightly smaller than the inner diameter of the vertically positioned cylindrical wall of said vessel, said ring portion being so adapted as to be normally positioned in a horizontal plane when said float member is in its floating condition, said float member movable in said vessel along its axis and having a bulk specific weight lying between those of the first and the second liquid, said vessel has wall portions of non-magnetic material along its axis at predetermined levels thereof, said float member has a peripheral portion of magnetic material adapted to be positioned adjacent the wall of said vessel, and magnetic proximity detectors are provided at the outside of said non-magnetic wall portions to detect predetermined upper and lower limit positions of said float member and thereby to control said valve means, characterized in that said body is a closed shell having a bellows portion and being filled with liquid.

References Cited

UNITED STATES PATENTS 384,200    6/1888    Ghegan _____________ 200—84.3

(Other references on following page)

References Cited

| | | | |
|---|---|---|---|
| 2,241,620 | 5/1941 | Shoeld | 103—165 |
| 2,254,539 | 9/1941 | Mattox | 103—165 |
| 2,694,171 | 11/1954 | Campbell | 200—84.3 |
| 2,704,034 | 3/1955 | Jones | 103—165 |
| 2,728,227 | 12/1955 | Eshbaugh | 73—319 |
| 3,013,735 | 12/1961 | Russo | 73—319(X) |
| 3,114,478 | 12/1963 | Hikemegier | 200—84.3 |
| 3,366,276 | 1/1968 | Fridley | 200—84.3 |
| 1,690,254 | 11/1928 | Skidmore, Jr. | |

WILLIAM L. FREEH, Primary Examiner

U.S. Cl. X.R.

73—322.5; 417—122, 126, 138

UNITED STATES PATENT OFFICE
CERTIFICATE OF CORRECTION

Patent No. 3,556,682　　　　　　　　　Dated　　January 19, 1971

Inventor(s) Masakatsu Sakamoto, Kenji Uchida, Yasunori Yamada ar Takashi Yamaguchi It is certified that error appears in the above-identified patent and that said Letters Patent are hereby corrected as shown below:

Column 1, line 12, which now reads:

"Dec. 28, 1967, 43/83,608, 43/83,609; Jan. 5,"

should read as follows:

-- Dec. 28, 1967, 42/83,608, 42/83,609; Jan. 5, --

Signed and sealed this 21st day of December 1971.

(SEAL)
Attest:

EDWARD M. FLETCHER, JR.　　　　ROBERT GOTTSC HALK
Attesting Officer　　　　　　　　Acting Commissioner of Paten